Figure 1:
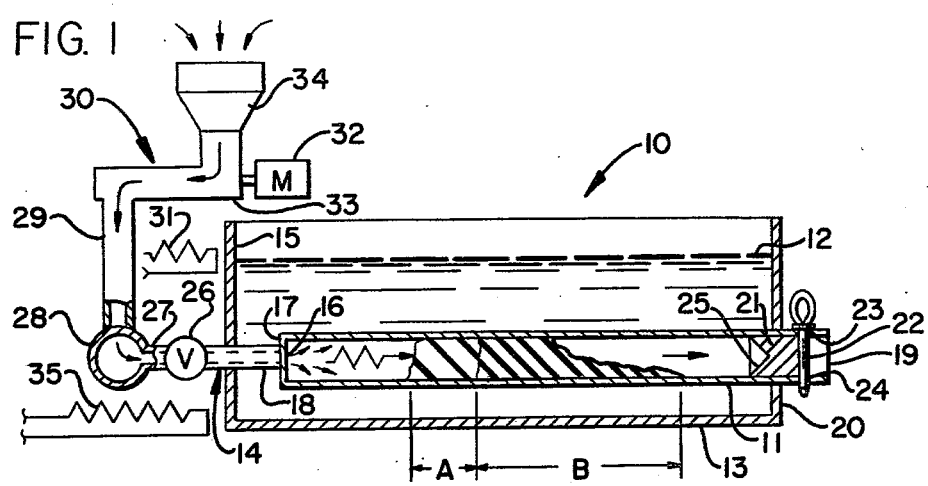

United States Patent [19] [11] 4,191,522

Turner [45] Mar. 4, 1980

[54] EXTRUDING MACHINE AND END PRODUCTS

[75] Inventor: James E. Turner, Southlake, Tex.

[73] Assignee: Entek Corporation, Southlake, Tex.

[21] Appl. No.: 962,872

[22] Filed: Nov. 22, 1978

Related U.S. Application Data

[63] Continuation of Ser. No. 799,244, May 23, 1977, abandoned.

[51] Int. Cl.² .............................................. B29H 19/00
[52] U.S. Cl. .................................... 425/552; 264/328; 264/334; 425/543
[58] Field of Search ................ 264/328, 334; 425/543, 425/552, 549, 554, 556

[56] References Cited

U.S. PATENT DOCUMENTS

| 93,972 | 8/1869 | Divine | 425/446 X |
|---|---|---|---|
| 840,213 | 1/1907 | Holoubek | 425/552 X |
| 2,917,776 | 12/1959 | Dorman | 264/37 |
| 3,477,101 | 11/1969 | Fritsch | 264/328 |
| 3,897,184 | 7/1975 | Woodburn | 264/111 |

FOREIGN PATENT DOCUMENTS 430789  2/1948  Italy .

Primary Examiner—Thomas P. Pavelko
Attorney, Agent, or Firm—Warren H. Kintzinger

[57] ABSTRACT

A molding apparatus, using raw material substantially comprised of crumbed rubber tires, and producing end products of durability and structural integrity. Products such as fence posts and dimensioned pieces like dimension-lumber products, have a hardened, dense outer wall structure surrounding a comparatively less dense and relatively porous central core, with the attendent structure integrity advantages of tubular and hollow-walled products. Heat fused raw material is fed under pressure, as from a screw extruder mechanism, through selectively controlled input valves to mold bodies, with the mold bodies carried in a chilled environment to establish fluid flow paths and hardening sequences leading to the desired end product body structure.

7 Claims, 9 Drawing Figures

EXTRUDING MACHINE AND END PRODUCTS

This is a continuation of application Ser. No. 799,244, filed May 23, 1977 now abandoned.

This invention relates in general to molded end-products and in particular to end products and an apparatus for making same from recycled rubber scrap.

Because of the nonbiodegradable characteristics of scrapped rubber products such as old automobile tire casings, and because of material shortages in general numerous products have been made, utilizing the scrap rubber advantageously as all or a substantial portion of a raw material mixture which may be heat fused and remolded into useful devices. Uniquely, the utilitarian aspects of many of these end products exceed that of similar products made of conventional materials. For example, in my U.S. Pat. No. 4,003,408 there is disclosed a porous underground irrigation pipe molded from a material mixture comprised substantially of particalized rubber tire bits. In my U.S. Pat. No. 4,028,288 there is disclosed porous container products useful, for example, as nursery pots, minnow buckets, garbage cans, etc.

Numerous wood products in use today, such as fence posts, railroad ties and dimension lumber are dependent upon our diminishing forest reserves as a source of material supply. For numerous applications wood products are especially vulnerable to rot and decay from excessive exposure to moisture, insects, dry-rot conditions, etc. Wood products must be coated with preservatives of some type when exposed to the environment. For example, railroad ties and fence posts have long been treated with creosote under pressure to protect the wood from moisture and boring insects. Special treatments and application of protective coatings of paints and oils add appreciably to the cost of wood materials and none are known to offer indefinite protection, with repeated treatment and eventual replacement adding more to the expense of wood product use.

It is, therefore a principal object of this invention to provide a new type of product for use in place of those conventionally made of wood; the new product having characteristics equalling or exceeding wood products used for the same purpose.

Another object is to provide a new product as a replacement for wood posts and dimension lumber which exhibits longer wear characteristics and appreciably greater immunity to rot and decay.

A further object is to provide a new wood replacement product which is economically produced from recycled scrap rubber.

Still another object is to provide an economical apparatus and effective method for making structural end products via pressure molding of a fused material mixture comprised substantially of particalized scrap rubber tires.

Features of this invention useful in accomplishing the above objects include the molding of end products from a fused, flowable raw material mixture comprised substantially of particalized scrap tires, with the fused material being pressure fed into an elongated mold with mold cross section definning the cross section geometry of the end product, such as a round post, and square or rectangular dimensioned pieces. The mold body is prechilled with chilling maintained after material injection, such that the outer body extremes harden rapidly into a dense mass, with the fluid inner core of the product being the last to flow such that attendant gasing results in a relatively porous central core. The end product then has the structural advantage of a tubular member, as opposed to a solid uniformally dense body, with attendant advantage of strength and resiliency. Fused material injection into the mold is accomplished through an input port communicating with one end wall of the mold at a location asymmetrically displaced from the longitudinal axis of symmetry of the mold body to provide for material flow paths within the mold conducive to a desired material hardening sequence which produces a dense outer surface layer with a porous central core. Removal of hardened end products from a selectively closable mold end opposite the input port end is facilitated uniquely by utilizing further application of injected fused material, with mold end opened, to push the hardened product from the mold.

Specific embodiments representing what are presently regarded as the best mode of carrying out the invention are illustrated in the accompanying drawings.

Figure 2:
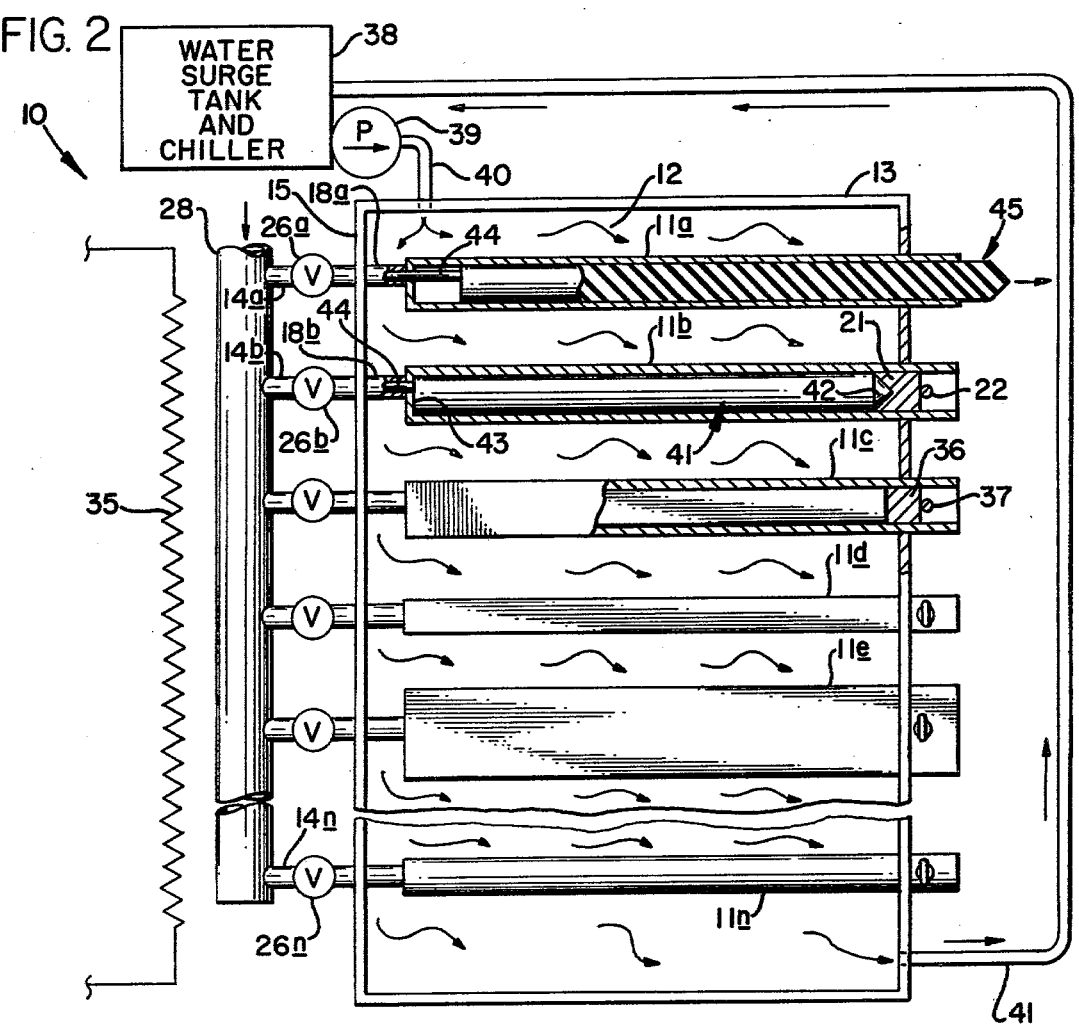
Figure 4:
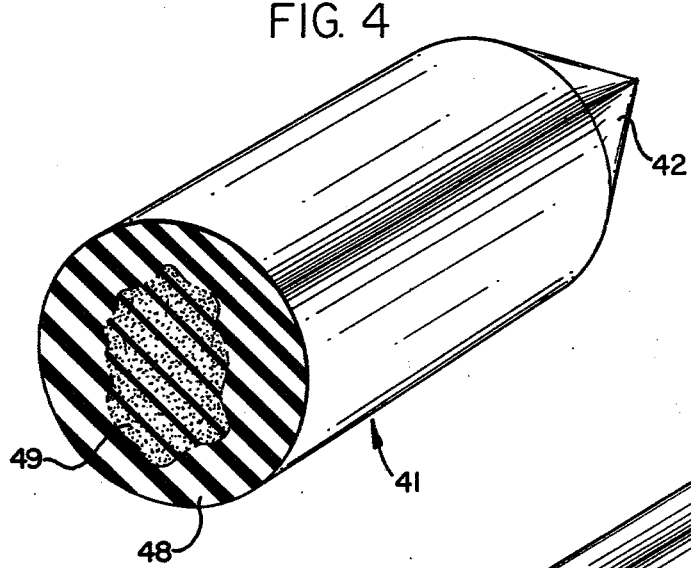
Figure 3:
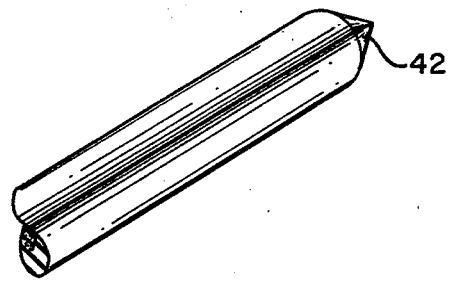
Figure 3A:
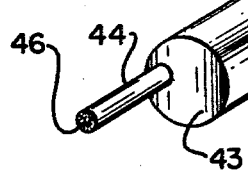
Figure 3A:
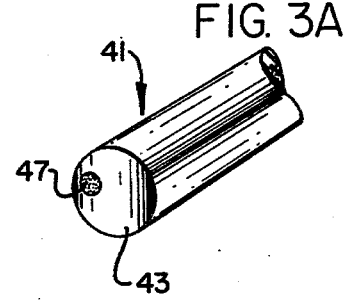
Figure 5:
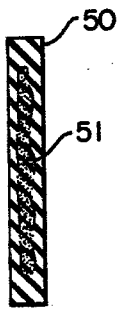
Figure 6:
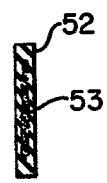
Figure 7:

In the drawings:

FIG. 1 represents a diagrammatic, partially sectioned, side view of an injection molding machine used to make the products of the invention;

FIG. 2, a diagrammatic partially sectioned top view of the apparatus of FIG. 1;

FIG. 3, an isometric view of a fence post member as removed from the apparatus of FIGS. 1 and 2;

FIG. 3A, an isometric view of the product of FIG. 4 with scrap residual appendage removed;

FIG. 4, an isometric cross-sectioned view of an end product of the apparatus of FIGS. 1 and 2, showing relatively dense outer wall areas and porous central core;

FIG. 5, is a cross-sectional view of a 2" by 12" dimensioned structural member producible by the apparatus of FIGS. 1 and 2;

FIG. 6, a cross-sectional view of a 1" by 6" dimensioned structural member;

FIG. 7, a cross-sectional view of a 2" by 4" dimensioned structural member; and

Figure 8:
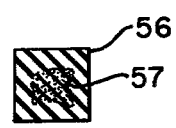

FIG. 8, a cross-sectional view of a 4" by 4" dimensioned structural member.

Referring to the drawings:

A molding machine 10 is shown in the side view of FIG. 1, depicting a single tubular mold body 11 substantially completely immersed in a bath of water 12 carried in a tank member 13. A material input line 14 extends through side wall 15 of the tank into communication with an input port 16 formed through the input wall end 17 of the mold body. A predetermined extent 18 of input line 14 is exposed to the water within the tank between tank wall 15 and input end wall 17 of the mold body.

The other end 19 of the mold body extends through end wall 20 of tank 13. A removal end plug member 21 is shown inserted in the mold body end 19 and is restrained from outward movement, as might be imposed by pressure within the mold body, by means of a clevis-like pin member 22 extended through diametrically opposed through-holes 23 and 24 in the mold body wall. As shown in FIG. 1, the end plug might have an inner face 25 formed as a concave conical surface, and the mold body 11 be in cylindrical form, so as to define a mold for a round post end product with pointed end.

Input line 14 to the mold body 11 is shown with an in-line flow control valve 26 and with input end 27 communicating with a material supply manifold 28. Manifold 28 receives heat fused input material from the output line 29 of a wave screw extruder mechanism 30. Extruder mechanism may comprise a conventional wave screw device complete with heating element means as functionally depicted in FIG. 1 by heating element 31, and motor means 32 to power the screw. Particalized raw material bits are supplied to the input end 33 of the wave screw extruder mechanism from a material hopper 34, which for purposes of the present invention would hold a supply of particalized rubber tire bits. In conventional manner, the raw material bits are heat fused and caused to be extruded through mechanism 30 to supply, under pressure, a flowable heat fused mass through output line 29 to manifold 28, and through valve 26 (when opened) to the input port 16 of the mold body 11. Further heating element means 35 are functionally depicted in FIG. 1 as being associated with the manifold 28 and mold input line 14, for the purpose of maintaining the material therein in a heat-fused, flowable state.

As depicted in FIG. 1, with power and raw material supplied to extruder mechanism 30, and extruder motor 32 energized, the opening of valve 26 in supply line 14 causes a flow of fused material into the confines of the mold body 11 and toward the plugged end 19 of the mold body. With the mold body being chilled, hardening of the fused material commences immediately at the outer edges of the mold, which are most directly exposed to the chilled water 12 in tank 13, and progressively through the central material flow path back to the input post end of the mold body, as depicted by progressively less hardened portions B and A of the hardening material. With the hardening accelerated at the edge extremes of the material most adjacent the chilled mold body walls, the outer wall portions of the hardened end product in the mold body are of considerable hardness and density, while subsequent center core fused material flow, through gassing, hardens into a relatively porous and comparatively much less dense mass.

FIG. 2 depicts a top view of the apparatus, with a plurality of mold bodies 11a–11n carried in chilling tank 13. A variety of mold bodies are shown. Mold bodies 11a and 11b are exampled as identical bodies each producing the aforedescribed end-pointed post as the molded end product. Also exampled is a mold body 11c with flat surfaced end plug 36 restrained by clevis 37, and which might be cross-section dimensioned for producing 2" by 2" dimensioned end products. Mold body 11d might be dimensioned to produce 1" by 2" dimensioned output products, with mold bodies 11e and 11h being respectfully dimensioned to produce still other standard or non-standard dimensioned end products.

As shown in FIG. 2, each of the molds, as exampled for mold bodies 11a and 11b has the input port end of the body connected with material manifold 28 through an associated input supply line which is fitted with an input flow control valve. Supply line 14a connects mold body 11a to the manifold, with material input fed selectively through valve 26a. Supply line 14b connects mold body 11b to the manifold with material fed selectively through valve 26b. As in FIG. 1, each of the supply lines connects to a mold body input port at a point displaced from the longitudinal axis of the associated mold body in relatively close proximity to a mold body side wall. Also, each input supply line has a portion thereof extending through the tank wall 15, such as extents 18a and 18b shown for the exampled supply lines 14a and 14b.

As in FIG. 1, a heater element 35 is functionally depicted as being associated with the manifold and input control valves for the purpose of maintaining material in the manifold and supply line portions exterior of the chill tank in a heat-fused, flowable state.

Chill tank 13 of FIG. 2 carries a sufficient quantity of water to completely immerse the mold bodies and those extents of input material supply line carried within the tank. For purposes of maintaining the water 12 in at a desired chilling temperature, and for rapid heat transfer from the molds in the tanks, a water surge tank and chiller 38 and associated pump 39 supply a flow of chilled water through input line 40, with water flow through the tank and via recirculating return line 41 to surge tank and chiller 38.

In operation, any one of the material input control valves may be opened to cause fused material to flow into the associated mold body, with end plug retained by the associated clevis. For example, FIG. 2 depicts mold body 11b (second from the top) as having been filled with fused material which was subsequently hardened to form a post end product 41 having a pointed end 42 and flat opposite end 43 from which extends a hardened projection 44 with cross-section defined by that of the supply line 14b and length defined by the extent 18b of supply line 14b which extends through the chilled water in the tank. Now, if the end plug 21 of mold body 11b were removed, a subsequent application of pressurized fused material through valve 26b would exert a force against the end of the hardened projection 44, using the projection 44 as a piston to force the projection 44 and attached end product 41 from the open output end of the mold body. This latter defined action is depicted for the uppermost depicted mold body 11a in FIG. 2, where projection 44 has moved inwardly by the extent that the end 45 of the molded piece has been forced out of the mold. It is now apparent that the projection 44 has been lengthened by the extent 18a of the supply line which is inside the chill tank. The molded piece may then be removed from mold body 11a by grasping the extended end 45 and applying a longitudinal pull force, whereupon, the projection 44 attached to the outer end fractures easily in the vicinity of the juncture of supply line 14a and tank wall 15 where the raw material remains in a soft, unhardened state due to the heat supplied to that portion of the supply line external of the tank.

A molded fence post 41, as pulled from its associated mold is shown in FIG. 3 as comprising a pointed end 42, and an opposite flat end 43 from which projection 44 extends. The terminus 46 of projection 44 represents the rupture point occuring in the vicinity of the tank wall, where only semi-hardened material parted as the post was pulled from the mold body. Projection 44, due to a relatively small cross-section, may then be ruptured or cut from the flat end 43 of the post at juncture 47 (as shown in FIG. 3a) and be discarded as waste.

It is thus seen that the molding apparatus uniquely employs the raw material source to mold the desired end product and, in addition, because it is selectively applied under pressure to the mold body, employs raw material to initiate removal of the molded end product from the mold end by forming an attached "piston-rod", as it were, to the outer end of the molded product and using subsequently applied raw material source pressure applied against the end of this attached "piston-rod" to force a length of end product from the mold body end sufficient to ficilitate grasping and pulling of the end product from the mold, with attached "piston-rod" easily rupturable of a semi-hardened point, and subsequently easily removable from the end product end as minimal waste. It should be noted that removal of the chilled hardened product is made easier by shrinkage within the mold as the products are chilled and hardened.

It is to be realized that, in employing multiple mold bodies, each with its associated input flow control valve, various sequencing operations would permit filling one mold while removing the end product from a previously filled and chilled mold body, etc. to maximize production rate from the plural mold apparatus.

Exampled end products are indicated in FIGS. 4–8. FIG. 4 shows a round post with high density outer wall portion 48 surrounding a less dense, relatively porous central core 49. FIG. 5 shows a 2" by 12" dimension piece in cross-section, with dense outer wall portion 50 surrounding porous central core 51; FIG. 6, a 1" by 6" dimension piece with dense outer wall portions 52 surrounding a porous central core 53; FIG. 7, a 2" by 4" dimension piece, with dense outer wall portions 54 surrounding a porous central core 55; and, FIG. 8, a 4" by 4" dimension piece with dense outer wall portions 56 surrounding a porous central core 57. Other products such as railroad ties may be produced by this process with, for example, the showing of FIG. 8 being a typical cross-section showing thereof enlarged, of course, from 4" by 4" size.

Whereas this invention is herein illustrated and described with respect to several embodiments thereof, it should be realized that various changes may be made without departing from essential contributions to the art made by the teachings hereof.

I claim:

1. An end product molding apparatus comprising an elongated hollow mold having a predetermined length and internal cross-sectional geometry respectively defining the length and cross-section geometry of a discrete product to be individually molded and subsequently removed from said mold; said mold having a predefined longitudinal axis of symmetry; plug means for selectively closing one end of said mold; said plug means having a mold interior facing end thereof defining a selected mold end geometry; an input supply line having a flow axis parallel to and displaced from the longitudinal axis of symmetry of said mold; said input supply line communicating with a material input port passed through the closed other end of said mold; said supply line and input port having a cross-sectional area substantially less than that of said mold; with substantially the entire cross-sectional area of said input port being displaced from the mold longitudinal axis of symmetry; said supply line being selectively connectable to a pressurized, heat fused flowable material source; enclosure means, means for maintaining the interior of said enclosure means at a chilled ambient temperature; with a predetermined longitudinal expanse of said input supply line being extended within said enclosure means and substantially all of said mold extending within said enclosure means with said one end thereof extended externally of said enclosure means.

2. The apparatus of claim 1, with said mold having a circular cross-sectional area and said input port communicating with the confines of said mold symmetrically about an axis radially displaced from the longitudinal axis of symmetry of said mold.

3. The apparatus of claim 1, with said mold having a cross-sectional area defined by respective pairs of opposed paralleled sides and said input port communicating with the confines of said mold symmetrically about an axis displaced from the longitudinal axis of symmetry of said mold and inwardly from one of said sides.

4. The apparatus of claim 1, with said mold having a rectangular cross-sectional area and said input part being symmetrically disposed about an axis inwardly from one of the smaller sides defining said rectangular cross-sectional area.

5. A plurality of the molds defined in claim 1, with respective input supply lines selectively connectable to a common manifold source of said pressurized, heat fused flowable material, and with each said mold and associated predetermined extent of supply line being extended through said chilled enclosure means.

6. The apparatus of claim 5, with said enclosure means comprising a tank means and with means for circulating chilled water through said tank means.

7. The apparatus of claim 6, with said input supply lines being selectively connectable to said material source through respective associated ones of a plurality of flow control valve means.

* * * * *